No. 621,508. Patented Mar. 21, 1899.
J. C. STINSON.
VEHICLE BRAKE.
(Application filed July 20, 1898.)
(No Model.) 2 Sheets—Sheet 1.
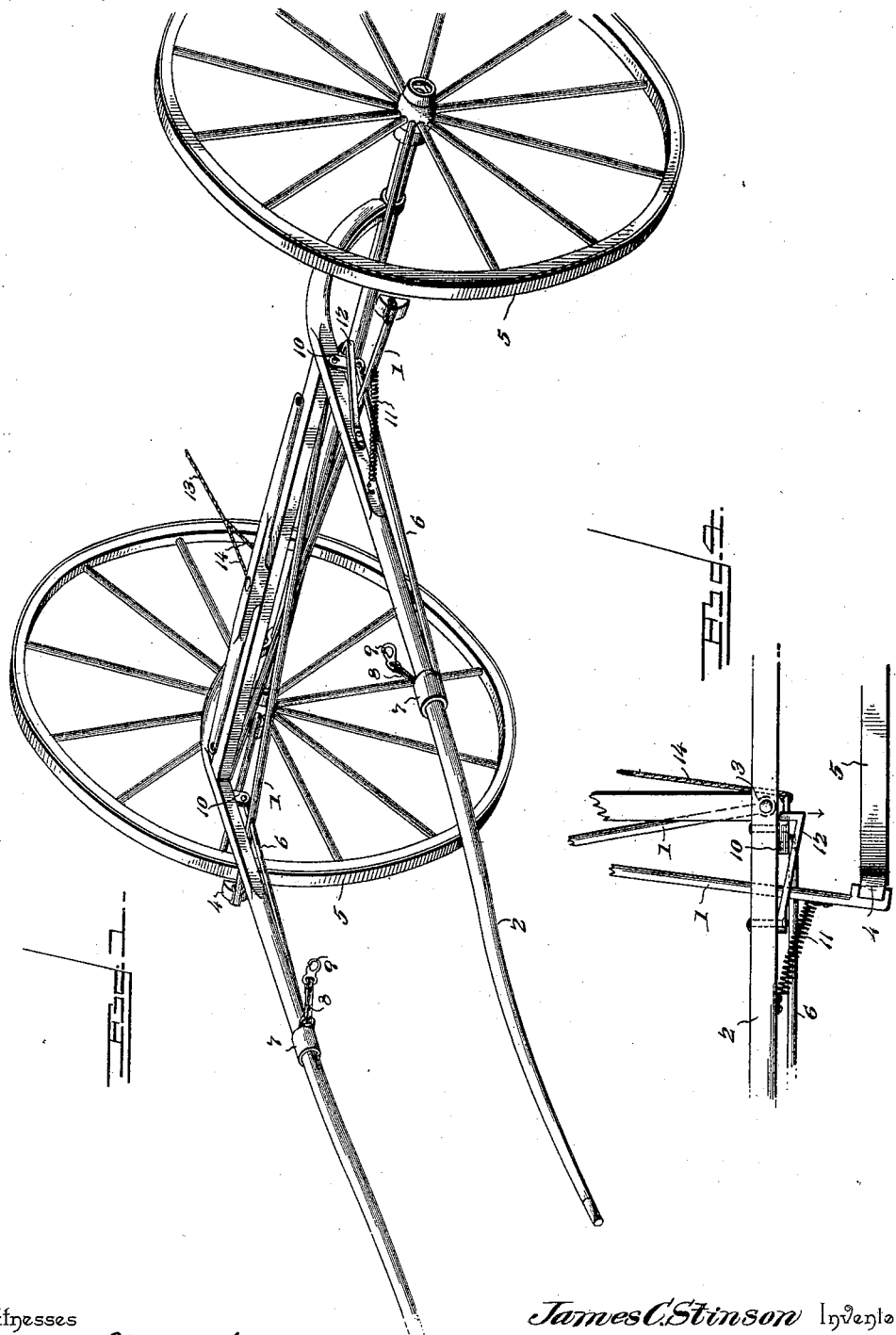
Witnesses
E. K. Stewart
J. J. Riley
James C. Stinson Inventor
By C. A. Snow & Co. Attorneys,

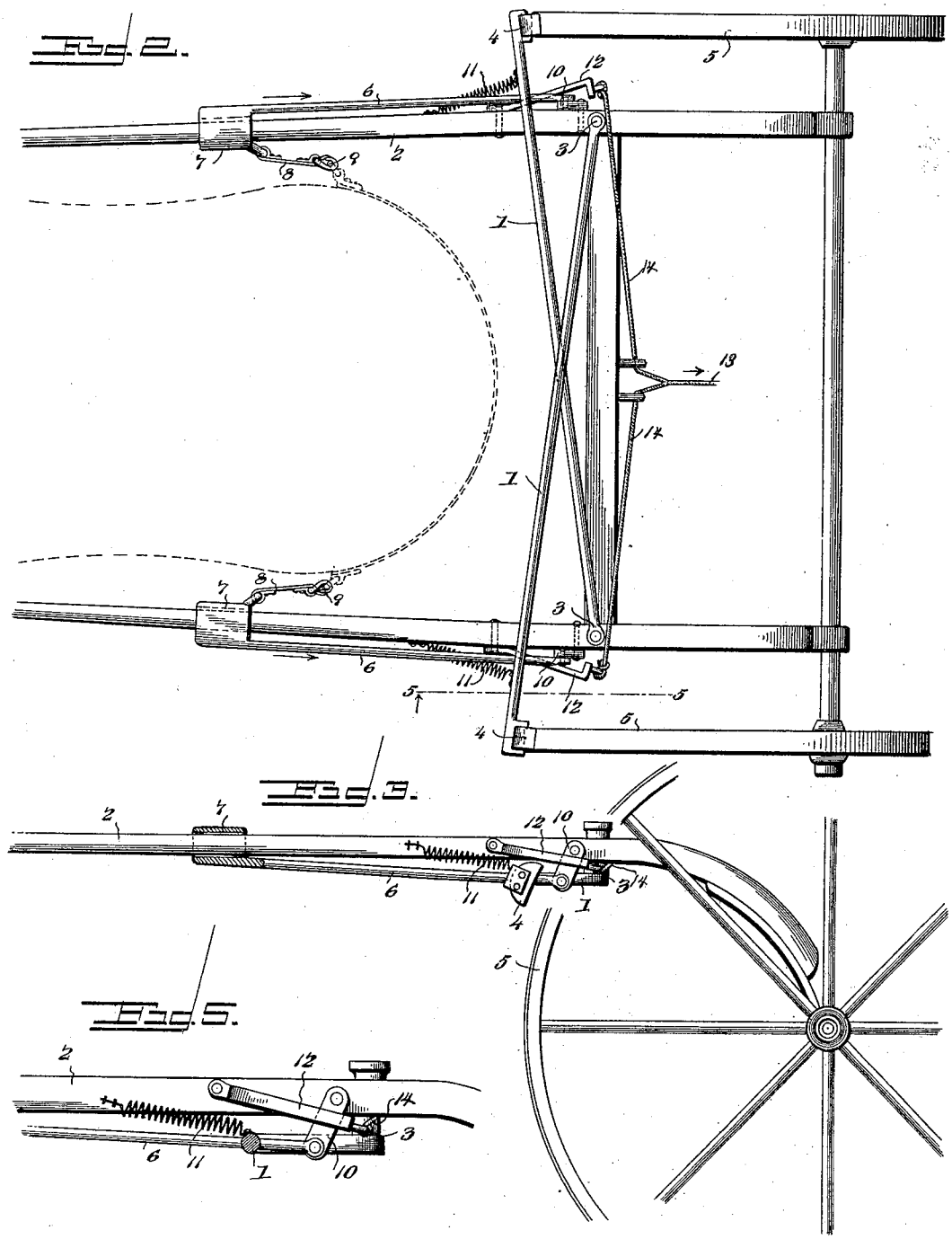

UNITED STATES PATENT OFFICE.

JAMES CARY STINSON, OF HENDERSON COUNTY, TENNESSEE.

VEHICLE-BRAKE.

SPECIFICATION forming part of Letters Patent No. 621,508, dated March 21, 1899.

Application filed July 20, 1898. Serial No. 686,437. (No model.)

*To all whom it may concern:*

Be it known that I, JAMES CARY STINSON, a citizen of the United States, residing in the county of Henderson and State of Tennessee, have invented a new and useful Vehicle-Brake, of which the following is a specification.

The invention relates to improvements in vehicle-brakes.

The object of the present invention is to improve the construction of vehicle-brakes, and to provide a simple, inexpensive, and efficient one adapted to be applied to buggies, carriages, and similar vehicles and capable of automatic operation to check a vehicle in descending a hill.

A further object of the invention is to enable the automatic brake to be readily thrown out of operation and held in such condition when it is desired to back a vehicle.

The invention consists in the construction and novel combination and arrangement of parts hereinafter fully described, illustrated in the accompanying drawings, and pointed out in the claims hereto appended.

In the drawings, Figure 1 is a perspective view of a portion of a running-gear provided with an automatic brake constructed in accordance with this invention. Fig. 2 is a reverse plan view of the same. Fig. 3 is a longitudinal sectional view of one side of the brake mechanism. Fig. 4 is a detail plan view of one side of the brake mechanism, illustrating the manner of locking the same out of operation. Fig. 5 is an enlarged detail view illustrating the manner of locking the brake-shoes out of engagement with the wheels.

Like numerals of reference designate corresponding parts in all the figures of the drawings.

1 1 designate a pair of brake-levers disposed transversely of a pair of shafts 2, crossing each other at the center of the rear portion of the shafts and having their inner ends 3 pivoted beneath the shafts at opposite sides thereof and provided at their outer ends with brake-shoes 4, located in advance of the front wheels 5 and adapted to engage the same. The brake-shoes are automatically applied by means of reciprocating push-rods 6, located at opposite sides of the vehicle and extending longitudinally of the shafts 2, as clearly shown in Figs. 1 and 2 of the accompanying drawings. The front ends of the push-rods are connected with sleeves or cuffs 7, slidingly mounted on the shafts and provided with devices 8, which are designed to be connected with the holdback-straps of a harness, whereby when there is a backward pressure or strain exerted by a horse incident to the vehicle moving forward on the draft-animal in descending an incline the brake-levers will be moved rearward and the brake-shoes will be carried into engagement with the front wheels. The devices 8, which may be of any desired construction, are preferably provided with snap-hooks 9 and may be of sufficient length to enable the snap-hooks to engage directly the rings of the harness, and thereby dispense with holdback-straps.

The rear ends of the push-rods are suspended from the shaft by oscillating links 10, pivoted at their upper ends to the shafts, at the outer faces thereof, and having their lower ends pivoted to the rods 6, which are connected in advance of the links with the brake-levers. This construction, besides constituting the operating mechanism for applying the brake-shoes, also serves for supporting the outer portions of the brake-levers.

The brake-shoes are normally held off the wheels by means of coiled springs 11, located at opposite sides of the vehicle and connected at their front ends to the shafts and at their rear ends to the brake-levers. When the brake-shoes are applied, the coiled springs are distended and operate to relieve the wheels of the brake-shoes as soon as the strain on the holdback-straps is relaxed.

When it is desired to back the vehicle, the brake-shoes are locked out of engagement with the front wheel by resilient catches 12, consisting of resilient bars or shanks secured at their front ends to the outer faces of the thills and engaging portions or heads located at the rear ends of the shanks and extending inward therefrom to engage the links 10 at the rear edges thereof. The catches 12 normally diverge from the shafts, and their engaging portions are held out of the plane of the oscillating links, and they are carried into engagement with the links by means of an operating-cord 13, provided with branches 14, which are secured at their outer ends to the catches. The branches pass through suitable guides of the cross-bar of the shafts, and when the operating-cord is pulled the catches are drawn inward into engagement with the oscillating links, and they thereby prevent the brake-shoes from engaging the wheels. As soon as the operating-cord is released after the operation of backing is completed the catches will automatically disengage themselves from the links.

The invention has the following advantages: The automatic brake, which is simple and comparatively inexpensive in construction, is positive in operation and is adapted to be applied to buggies, carriages, and analogous vehicles. The brake-shoes are automatically applied when there is a strain on the holdback-straps incident to the vehicle moving forward on the draft-animal, and as soon as the holdback-straps slacken the brake-shoes are automatically thrown off the wheels. When it is desired to back the vehicle, the brake-shoes may be locked out of engagement with the wheels by simply drawing in on the operating-cord, and when the latter is released the catches will automatically disengage themselves from the oscillating links.

Changes in the form, proportion, and minor details of construction may be resorted to without departing from the spirit or sacrificing any of the advantages of this invention.

What I claim is—

1. In a brake, the combination with a pair of shafts, of transverse brake-levers crossing centrally of the same, fulcrumed at opposite sides thereof and carrying brake-shoes arranged to engage the front wheels, reciprocating push-rods extending longitudinally of the shafts, connected at their rear ends with the brake-levers and designed to have the holdback-straps attached to them, means for suspending the rear ends of the push-rods from the shafts, and coiled springs located at opposite sides of the running-gear and connected with the shafts and with the brake-levers to hold the brake-shoes normally off the wheels, substantially as described.

2. In a brake, the combination with a pair of shafts, of transverse brake-levers carrying brake-shoes, reciprocating push-rods slidingly connected at their front ends with the shafts and having their rear portions connected with and supporting the brake-levers, and means for suspending the rear ends of the push-rods from the shafts, substantially as described.

3. In a brake, the combination with a pair of shafts, of transverse brake-levers carrying brake-shoes, the reciprocating push-rods slidingly connected at their front ends with the shafts and supporting the brake-levers at their rear ends, and oscillating links connected with the push-rods and depending from the shafts, substantially as described.

4. In a brake, the combination with a pair of shafts, of transverse brake-levers, oscillating links connected with the shafts and the brake-levers, and catches arranged to engage the links for locking the brake-shoes out of engagement with the wheels, substantially as described.

5. In a brake, the combination with a pair of shafts, of transverse brake-levers, reciprocating push-rods slidingly connected at their front ends with the shafts and connected at their rear ends with the brake-levers and supporting the same, oscillating links depending from the shafts and connected with the push-rods, springs for holding the brake-levers normally off the wheels, catches mounted on the shafts and arranged to engage the links, and operating mechanism connected with the catches, substantially as described.

In testimony that I claim the foregoing as my own I have hereto affixed my signature in the presence of two witnesses.

JAMES CARY STINSON.

Witnesses:
  W. J. LONG,
  J. M. BARTHOLOMEW.